United States Patent [19]
Maaghul et al.

[11] 3,918,947
[45] Nov. 11, 1975

[54] METHOD OF CONTROLLING GLASS FIBER FORMING OPERATION

[75] Inventors: John Maaghul, Monroeville; David H. Griffiths, Allison Park, both of Pa.

[73] Assignee: PPG Industries, Inc., Pittsburgh, Pa.

[22] Filed: Jan. 7, 1975

[21] Appl. No.: 539,215

[52] U.S. Cl.............. 65/3; 65/11 W; 34/23; 34/155; 427/178
[51] Int. Cl.² .................. C03B 37/02; C03C 25/02
[58] Field of Search ........ 117/119.6; 65/2, 3, 11 W, 65/1, 12; 34/23, 155; 427/178

[56] References Cited
UNITED STATES PATENTS
| | | | |
|---|---|---|---|
| 3,718,448 | 2/1973 | Fahley | 65/3 |
| 3,718,449 | 2/1973 | Drummond | 65/3 |

Primary Examiner—Robert L. Lindsay, Jr.
Attorney, Agent, or Firm—John E. Curley

[57] ABSTRACT

A process is described in which textile strands containing a moisture laden coating thereon are passed through a drying oven to remove moisture therefrom and in which operation strands passing through the oven are protected from damage by providing an automatic gathering means in the oven to consolidate the strands into a single bundle during any interruption in the drying process. Consolidation of a multiplicity of moisture laden strands passing through an oven during drying into a single unitary strand prevents burn off of the individual strands passing through the oven and eliminates the need for rethreading the multiplicity of strands through the oven after the operation is resumed.

6 Claims, 4 Drawing Figures

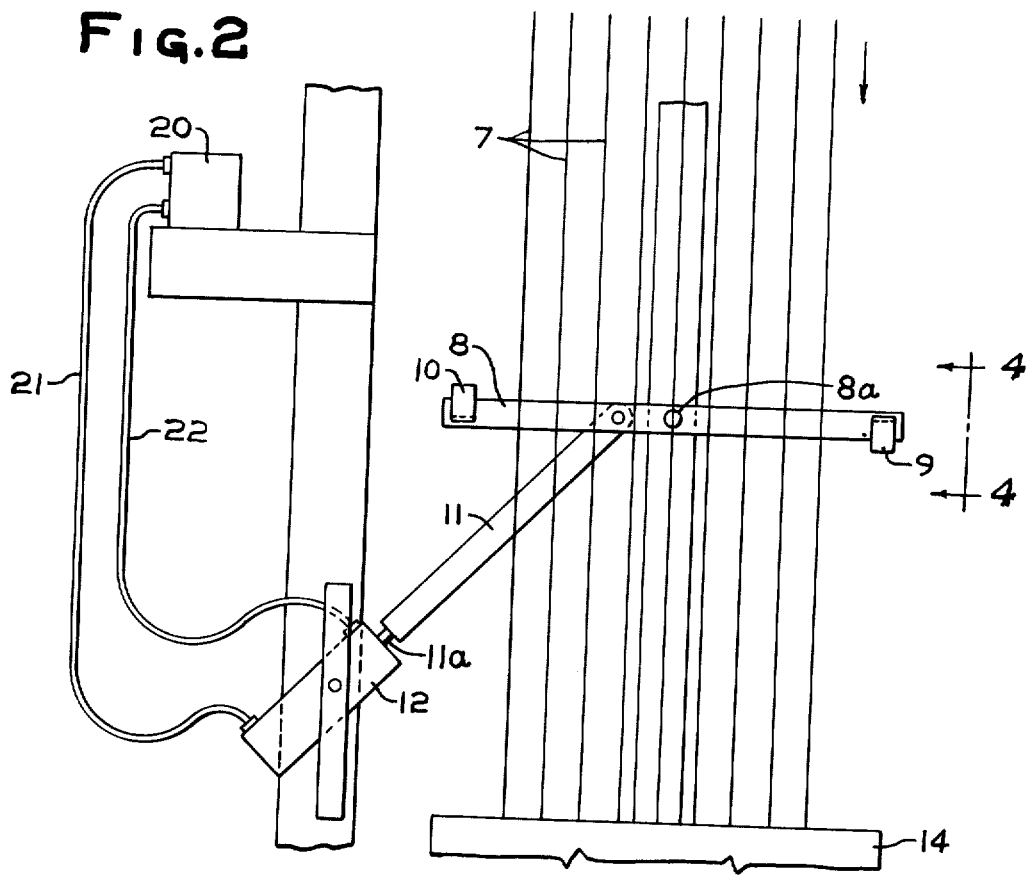
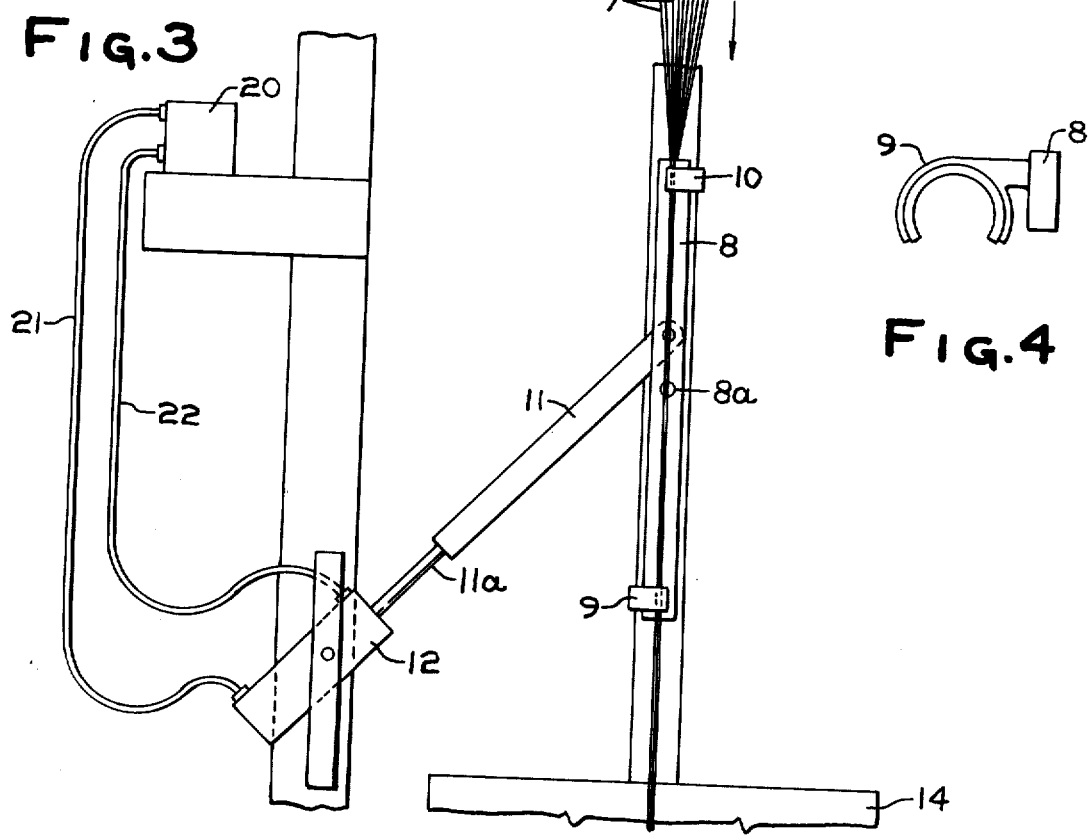

METHOD OF CONTROLLING GLASS FIBER FORMING OPERATION

BACKGROUND OF THE INVENTION

The tendency in industry today and in particular in the fiber glass manufacturing industry is to incorporate as many of the processing steps normally required to produce a finished product as close as possible to the forming level. Thus, many patents have issued which are concerned with the direct coating of materials emanating from fiber glass bushings underneath the bushings with the drying steps being incorporated therein as well as winding and collection steps. In a recently issued U.S. patent, U.S. Pat. No. 3,718,448, a process is described for the manufacture of fiber glass strands for use in plastic and elastomer reinforcing application. In this process a multiplicity of filaments removed from the bushing during the forming operation are passed over an applicator surface where they are naturally or mechanically gathered into a plurality of fiber glass strands. The strands are then immediately passed into a series of drying units and are ultimately collected. This operation has the advantage of providing the immediate coating of the material under the bushing and the drying of that coating on the strands as they are formed, thereby eliminating the conventional forming package production followed by the removal of these forming packages to a coating department for subsequent coating. In these instances these forming packages are removed to a twisting department where the strand is removed from the forming packages and twisted on bobbins and the bobbins are ultimately used as the feed source of the strand for a coating operation.

While the invention described in the aforesaid U.S. patent goes a long way towards eliminating substantial costs involved in normal production of coated fiber glass strands, containing multifilaments, some difficulties are encountered in systems of this character when an interruption in the operation occurs for any one of various reasons. Difficulties are also encountered should the movement of the strands through the drying zone become slower than normal for a given operation. In such instances i.e. where the strands are either stopped or moved at a slower than normal rate through the drying zone, burn off of the coating or destruction of the strands can readily occur since they are quite small and are normally exposed to rather severe operating conditions.

THE PRESENT INVENTION

In accordance with the present invention, a process for the direct coating of a multiplicity of textile strands and in particular fiber glass strands is improved considerably by providing in the area above the drying zone a strand gathering device which consolidates the strands into a single bundle during any process interruption. This gathering of the strands into a single bundle during a process interruption or slow down provides sufficient time in a normal situation for the operator to vent the oven or shut it down and prevents any serious damage to the individual strands previously fed thereto. Further, the invention assists in providing safety to the operation during start up and termination procedures.

Thus, in accordance with the present invention, a multiplicity of filaments being continuously formed in a textile forming operation are passed over an applicator which applies to the filament surfaces requisite quantities of an aqueous solution of a coating or size. Typical of coating compositions employed are heat curable elastomeric or resin coatings which are used on the finished strand for a particular purpose, i.e., plastic or elastomeric reinforcement. The filaments after passing over the surface of the applicator are gathered into a multiplicity of individual small strands which are then subsequently passed through a drying and curing zone where a substantial portion of the moisture content of the coating is removed and the coating on the strand if necessary is fully cured or at least partially cured. Passage of the multiplicity of strands through the oven is maintained at a continuous rate of speed and when a process interruption occurs, the strands are gathered immediately into a single bundle. Since the unitary bundle presents a strand that has substantial moisture therein, considerable protection is provided against a rapid overheating of that strand.

The drying source may then be deactivated to prevent any damage to the consolidated single bundle containing the multiplicity of strands which were being fed when the interruption occurred. When the cause of interruption has been corrected, the operation is begun again by opening the strand gathering device located above the oven to permit the multiplicity of strands forming the large bundle to separate and pass through the oven again as a multiplicity of small strands thus eliminating the need for rethreading of the entire oven.

The invention will be more readily understood by reference to the accompanying drawings in which:

FIG. 2 shows an enlarged view of the strand gathering device of the instant invention.

FIG. 3 is a side view of the strand gathering device of the instant invention in a closed position.

FIG. 4 is a cross section of one of the arms on the strand gathering device taken along section lines 4—4 of FIG. 2.

Figure 1:
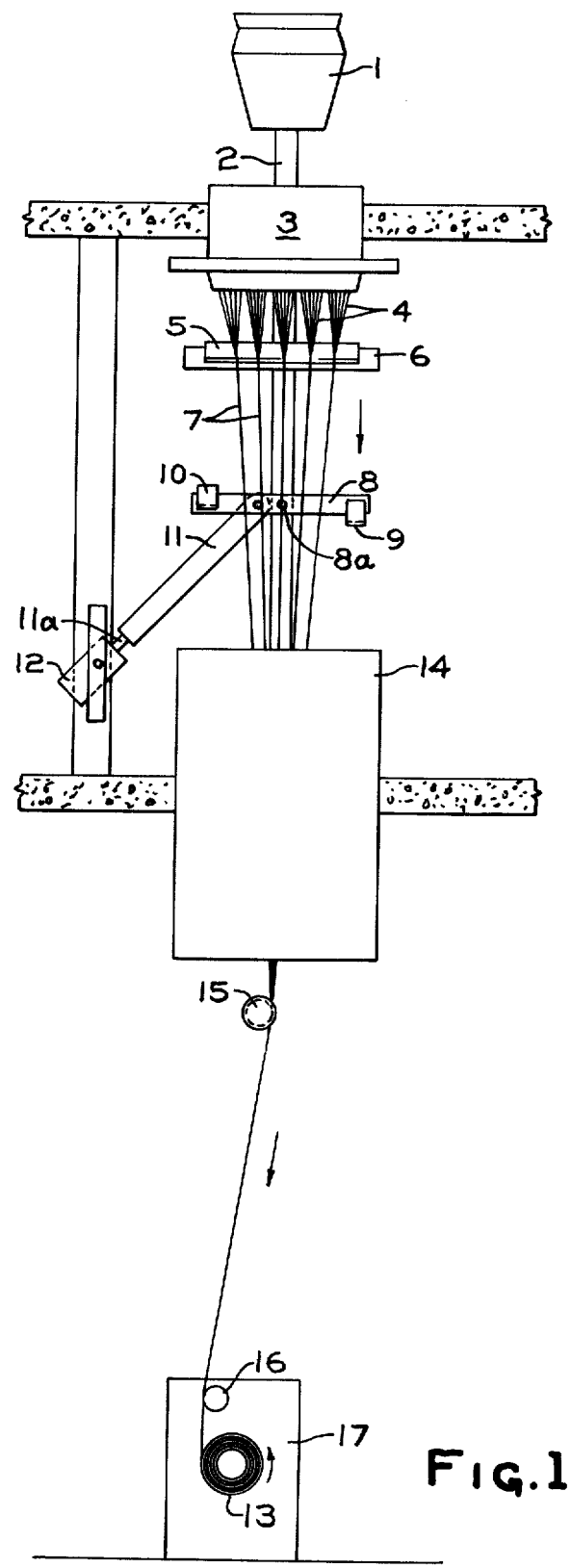
FIG. 1 is a schematic illustration of a fiber glass bushing and its associated applicator and drying unit showing the positioning of the strand gathering device utilized in the method of the instant invention.

As shown in FIG. 1, a hopper 1 is provided for the feeding of glass marbles through a chute 2 into a fiber glass marble melt bushing 3. This bushing is a conventional marble melt bushing equipped with an electrical power source to melt the glass marbles and is provided on its underside with a multiplicity of orifices through which the molten glass flows to form filaments. Typical marble melt bushings are described in U.S. Pat. Nos. 3,104,761 and 3,028,442. The glass filaments 4, as can be seen in the drawing, pass over the surface of an applicator 5 maintained in a housing 6 and by a natural grouping, probably caused by the surface tension characteristics of the coating as it is applied to the filaments, are gathered into a plurality of fiber glass strands 7. Strands 7 pass in close proximity to a horizontally placed arm 8 equipped at each end with a cup-like devices 9 and 10. Arm 8 is pivotally mounted to a plate 11 rigidly fixed on a piston rod 11a which is housed in a pressure cylinder 12. The strands 7, after passing in close proximity to surface of the arm 8, pass into an oven 14 which is utilized to dry the coatings contained on the strands. The strands are then passed through a gathering shoe 15 which consolidates the strands 7 into a unitary strand 13. The strand 13 is wound on the winder 17 after passing through the spiral or traverse 16.

Turning to FIG. 2, the strand gathering device is shown in more detail. FIG. 2 shows the gathering device in the open running position with the arm 8 at right angles to the direction of travel of the strands 7 as they descend towards the oven 14. The cup-like members 9 and 10 are at the far extremities of the paralleled strands 7 and all strands are traveling on the interior sides of both of these arm devices. The piston rod 11a is in a retracted position with a major portion of its length positioned in the interior of the pressure chamber 12. An air supply source for actuating the pressure chamber 12 and piston rod 11a is provided in line 21 and a pressure relief for the pressure chamber 12 is provided in line 22. These lines are actuated and deactuated by the operation of a switch located in box 20 in a conventional manner in response to an operator's instruction. If desired, the switch mechanism can be electrically controlled to activate the application of air pressure or the release of air pressure in the housing 12 any time a strand 7 travels at speed below a preset value or whenever a breakout of a strand 7 occurs at the bushing level or elsewhere.

Turning to FIG. 3, the strand gathering device is shown in its closed position and it will be noted that the cylinder 12 has been actuated by the application of air pressure through line 21. The piston rod 11a has moved forward and upward. The movement of the rod 11a causes the arm 8 to rotate 180° at its pivotal attachment to plate 11 and the cups 9 and 10 at the end portions of the gathering device have gathered the strands 7 into a single unitary bundle 7a which is now maintained in this form above and inside the oven 14 until such time as the gathering device is deactivated by a correction of the condition causing the activation of it initially.

Upon a retraction or a repositioning of the plate 11 and the associated arm 8 and cups 9 and 10 from their closed position to their open position, strands 7 immediately reform from the single bundle formed in the oven to the configurations shown in FIG. 2.

The method of the instant invention has been found to be particularly useful in a standard, direct coating operation utilizing high temperature drying ovens such as hot air ovens where winder speeds are generally slow during start up and shut down periods. Because of the slow speeds during start up and shut down, the small strands normally passing through the oven are exposed to extremely high temperatures for both the glass and conventional organic coating materials used causing ignition and burning off of coating and damage to the filaments. Thus, in a standard operation of a direct coating system wherein organic materials are utilized as a coating for a multiplicity of fiber glass strands, a process improvement is provided by gathering the strands into a single unitary bundle, concentrating the water-containing coating in that large bundle and passing that through the high temperature drying oven until the winder speed has reached a sufficient value to provide a residence time for the smaller diameter normal strands passed through for drying sufficient to permit them to pass through the oven without having the coating burned or the glass damaged. Similarly, during a shut down of the operation where winder speeds are being reduced and strand travel through the high temperature drying ovens is also reduced, the process of the instant invention finds utility in that the strand gathering into a unitary bundle can be correlated to the reduction in winder speed below a given value to provide a single strand passing through the high temperature oven during the period of shut down. The oven may then be turned off and the temperature allowed to reduce to a sufficient value so that no danger to the single bundle is presented during this shut down period.

As can be readily appreciated, the method of the instant invention provides several useful advantages to continuous strand drying operations located in close proximity to fiber glass forming operations permitting a safe and easy operation. Accidental burning of the strands during a slow down or shut down for any reason is readily avoided.

EXAMPLE

In a typical fiber glass forming operation and discussing this operation with respect to FIGS. 1, 2 and 3 of the instant application, a plurality of fiber glass filaments 4 are drawn from a fiber glass bushing having 1000 holes. These filaments are gathered into 40 strands (25 filaments per strand) as they were passed over the applicator 5. During their passage over applicator 5, the filaments 4 and the consequent strands 7 removed therefrom have applied thereto about 50 percent by weight of a heat curable elastomeric coating having the composition shown below in Table I.

Table I

| Ingredients | Parts by Weight |
| --- | --- |
| Resorcinol | 340 |
| CH$_2$O (37 percent aqueous solution) | 500 |
| NaOH | 4.65 |
| Butadiene - Styrene - Vinyl pyridine terpolymer latex (Gen-Tac - 41 percent solids dispersed in water) | 7565 |
| NH$_4$OH (28 percent NH$_3$ in H$_2$O) | 350 |
| Deionized water | 6725 |
| Gamma, Aminopropyltriethoxysilane (7 percent aqueous solution) | 535 |
| Solids Content (nonaqueous) by weight | 23.4 percent |

The strands 7 containing the coating from Table I are then passed into a high temperature drying oven 14 operating at a temperature of 300° to 800 °C.

At the start of the operation and the actuation of the winder 17, the strands 7 traveling through the oven are operating at speeds of several hundred feet per minute, typically, 300 to 900 feet per minute (91 to 274 meters per minute). The strand gathering device is actuated so that the cups 9 and 10 of the gathering arm 8 are in the position shown in FIG. 3 and a single unitary strand is being passed through the oven 14. Upon attaining speeds of 1,000 to 3,000 feet per minute (304 to 914 meters per minute) or more, the strand gathering device is actuated by the operator to move it into the position shown in FIG. 2 and the strands 7 are passed through the oven as individual strands. Upon completion of the operation, the winder is slowed down and stopped. As the speed of the winder is decreased to result in the strands traveling at speeds below 1,000 feet per minute (304 meters per minute), the strand gathering device is again actuated by the operator to provide a unitary strand for passage through the oven. Upon resumption of the operation, no appreciable burning of any of the individual strands 7 is observed. In tests conducted prior to the utilization of the device shown and the use of this strand gathering method of the instant invention, often during interruptions or start ups, the strands 7 were found to be burned as they were removed from the oven 14 during a start up and shut down of the direct coating operation.

The device and method of the instant invention is also useful in operations wherein glass fiber strands are coated by a direct coating system to prepare glass strands for use in reinforcing plastics. Thus, strands may be coated with heat curable resin compositions such as described in Example II of U.S. Pat. No. 3,718,448 and dried in hot air ovens like oven 14 herein. In these operations use of the instant invention will prevent damage to the strands should the strand travel speeds run below 1,000 feet per minute (304 meters per minute) by consolidating them into a single strand until the strand speeds reach 1,000 or more feet (304 meters) per minute. Similarly the invention may be employed where aqueous sizes such as conventional organic silanes are used to coat the fibers or in the production of textile strands where aqueous starch solutions are normally employed as the coating material.

While the invention has been described with reference to specific embodiments and illustrations, it is not intended that it be limited thereby except insofar as appears in the accompanying claims.

We claim:

1. In the coating of glass fibers wherein glass fibers are drawn at high speeds from a molten glass source, coated while being drawn at high speed and passed through a high temperature drying zone to remove moisture therefrom after coating and wherein the fibers have been gathered prior to their admission to the drying zone into a plurality of small strands, the improvement comprising gathering the said plurality of small glass strands into a single consolidated strand after coating and passing the single consolidated strand through said drying zone when the speed of said individual strands passed through said drying zone is below a value during coating which would damage said individual strands during drying, to thereby prevent damage to said individual strands.

2. In a fiber glass forming operation wherein a plurality of filaments are drawn from a fiber glass bushing, passed over an applicator which applies an aqueous coating thereon and wherein the filaments are then gathered into a multiplicity of individual fiber glass strands containing a multiplicity of glass filaments in each of said strands and wherein said strands so formed are passed through a high temperature drying zone operating at a temperature of between 300° and 800°C. and wherein said strands are traveling through said zone at a rate of speed such that substantial damage to the coating can occur at said temperatures, the improvement comprising gathering said strands into a single unitary strand and passing that unitary strand through the drying zone until the rate of travel of said unitary strand passing through said drying zone has reached a speed such that damage to the coating is avoided on the individual strands and then releasing the consolidated strand to reinstitute passage through the drying zone of the individual multiple fiber glass strands.

3. In the coating of glass fibers wherein glass fibers are drawn at high speed from a molten glass source, coated while being drawn at high speed, consolidated into a multiplicity of small strands each containing a multiplicity of fibers and the strands are passed through a high temperature drying zone, the improvement comprising passing said multiplicity of strands through said oven at speeds in excess of 1,000 feet (304 meters) per minute while maintaining the oven at temperature between 300° and 800°C., immediately consolidating said multiplicity of strands into a single unitary strand whenever said speed of said multiplicity of strands falls below 1,000 feet (304 meters) per minute to thereby protect said multiplicity of strands from damage during their passage through said oven, and reestablishing said multiplicity of strands from said consolidated strand when the speed of said consolidated strand reaches 1,000 feet (304 meters) per minute.

4. The method of claim 3 wherein said strands are coated with an elastomeric coating.

5. In the process for preparing a strand of glass fibers for use in reinforcing an elastomeric or resin matrices wherein glass fibers are drawn from a molten glass source, the fibers are coated with a heat curable elastomeric or resin coating, the fibers are then formed into a plurality of glass fiber strands each containing a multiplicity of fibers, said plurality of strands are passed through an oven operating at temperatures sufficient to remove moisture therefrom and at least partially cure said coating the improvement comprising passing said multiplicity of strands through said oven as a single consolidated strand until the speed of travel has reached at least 1,000 feet (304 meters) per minute, separating the consolidated strand into a multiplicity of strands as separate strands when the consolidated strand reaches a speed of 1,000 feet (304 meters) per minute and drying the multiple strands traveling at these speeds.

6. In the process for preparing a strand of glass fibers for use in reinforcing elastomeric or resin matrices wherein glass fibers are drawn from a molten glass source, the fibers are coated with a heat curable elastomeric or resin coating, the fibers are gathered into a multiplicity of glass fiber strands, each strand containing a multiplicity of fibers and wherein said multiplicity of glass fiber strands are passed through an oven at temperature sufficient to at least partially cure said coating and at speeds such that said strands are not damaged by the oven temperatures, the improvement comprising consolidating said multiplicity of glass fiber strands in the oven into a unitary strand when the speed of travel of the said multiplicity of strands falls below a speed at which damage will not occur for a given oven temperature and maintaining said multiplicity of glass fiber strands as a single unitary strand until a safe speed of travel through the oven at said given temperature is reestablished.

* * * * *